United States Patent [19]

Yoshinaga

[11] 4,390,254
[45] Jun. 28, 1983

[54] FIELD STOP OPERATING MECHANISM FOR MICROSCOPES

[75] Inventor: Makoto Yoshinaga, Hachiouji, Japan

[73] Assignee: Olympus Optical Co., Ltd., Tokyo, Japan

[21] Appl. No.: 204,904

[22] Filed: Nov. 7, 1980

[30] Foreign Application Priority Data

Nov. 13, 1979 [JP] Japan .................. 54-157344[U]

[51] Int. Cl.³ .................................. G02B 21/06
[52] U.S. Cl. .................................. 350/523
[58] Field of Search .............. 350/17, 87, 88, 89, 350/90, 91, 448, 449

[56] References Cited

U.S. PATENT DOCUMENTS 2,493,770  1/1950  Manning ............... 350/17 X
3,820,882  6/1974  Jakubowski ........... 350/17 X
4,166,671  9/1979  Lisfeld et al. ........... 350/87

OTHER PUBLICATIONS

Instructions for "Orthoplan" (date unknown).
"Dialux" advertisement (date unknown).

Primary Examiner—John K. Corbin
Assistant Examiner—Matthew W. Koren
Attorney, Agent, or Firm—Cushman, Darby & Cushman

[57] ABSTRACT

A field stop operating mechanism for microscopes to be used with a microscope, which is provided with an illumination system having its optical axis passing in the inside of the base of the microscope and arranged to direct the light from a light source toward a condenser lens by deflecting the optical axis by means of a reflecting mirror, the field stop operating mechanism comprising a field stop and window lens means respectively arranged in front and rear of the reflecting mirror, a rotating ring provided to the field stop and an operating ring arranged near the window lens means, the rotating ring and operating ring being connected to each other by means of bevel gears which mesh with each other.

2 Claims, 5 Drawing Figures

FIELD STOP OPERATING MECHANISM FOR MICROSCOPES

BACKGROUND OF THE INVENTION (a) Field of the Invention

The present invention relates to a field stop operating mechanism for microscopes.

(b) Description of the Prior Art

Among known illumination systems for microscopes, there is an illumination system arranged to deflect its optical axis O, which passes in the inside of a base 4, at the right angle by means of a reflecting mirror 1 as shown in FIG. 1 and to thereby direct the light from a light source, which is not shown in the figure, upwardly by the reflecting mirror 1 toward a condenser lens. In such illumination system, a field stop 2 and a window lens means 3 are arranged in front and rear of the reflecting mirror 1 and, moreover, the field stop 2 is arranged in the middle portion of the base 4. In case of a microscope having such illumination system, an operating ring 6 is integrally fixed to a rotating ring 5 as shown in FIG. 2, a lever 6a of the operating ring 6 is projected upward beyond the top surface of the base 4, and the field stop 2 is stopped down and opened by operating the lever 6a. However, the above-mentioned field stop operating mechanism has disadvantages as described below. That is, as the lever 6a is located at a deeper position (position on the right in FIG. 1) when seen from the position of the person who operates the microscope and, moreover, the window lens means 3 exists on this side (left side in FIG. 1) of the lever 6a. Therefore, it is inconvenient to operate the lever 6a. Besides, a gap exists at the portion where the lever 6a of the operating ring 6 is projected from the base 4, and it is difficult to stop up the gap. Consequently, dust and the like tend to enter the inside of the illumination system through the gap.

SUMMARY OF THE INVENTION

It is, therefore, a primary object of the present invention to provide a field stop operating mechanism for microscopes wherein the operating ring is provided at a position near the window lens means and is connected to the rotating ring provided to the field stop so that the operating ring can be operated easily.

DETAILED DESCRIPTION OF THE PREFERRED EMBODIMENT

Figure 1:
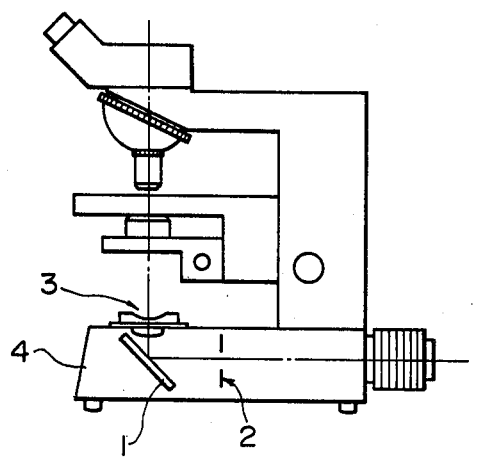
FIG. 1 shows a schematic illustration of an illumination system for a microscope.
Figure 2:
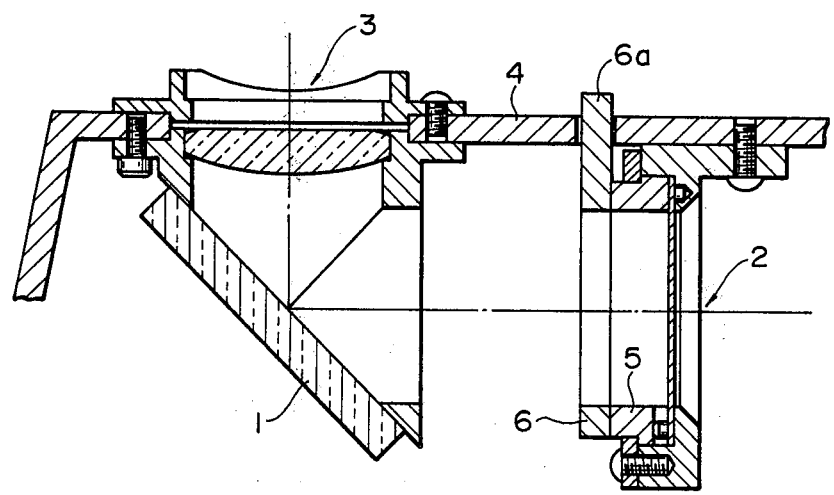
FIG. 2 shows a vertical sectional view of a known field stop operating mechanism.
Figure 3:
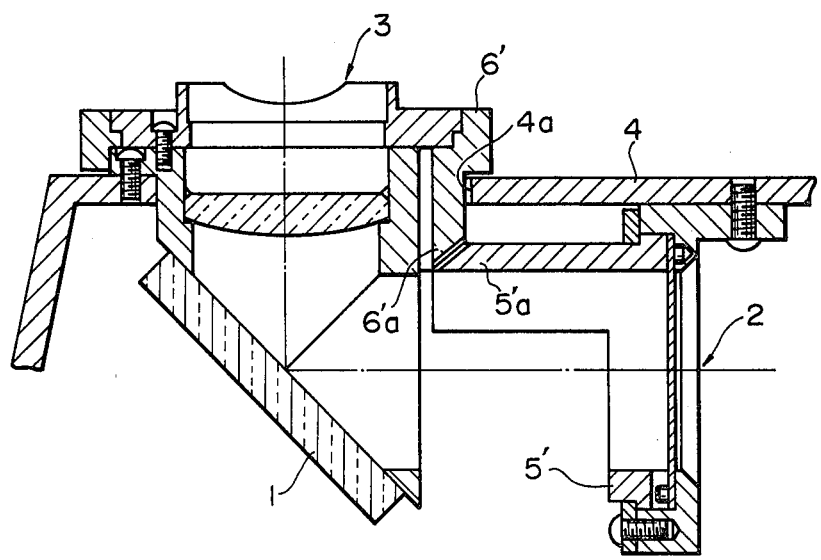
FIG. 3 shows a vertical sectional view of an embodiment of the field stop operating mechanism according to the present invention.
Figure 5:
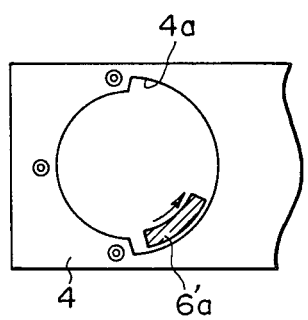
FIG. 5 shows a plan view illustrating a cut hole provided to the base of the microscope.
Figure 4:
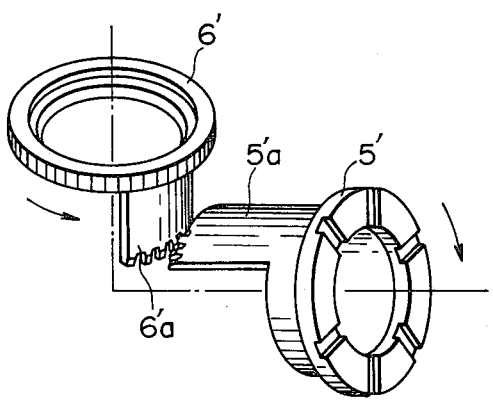
FIG. 4 shows a perspective view of the important portion of the embodiment shown in FIG. 3.

In FIGS. 3 through 5 showing a preferred embodiment of the field stop operating mechanism according to the present invention, numeral 1 designates a reflecting mirror, numeral 2 designates a field stop, numeral 3 designates a window lens means, and these are substantially same as those of known microscope illumination systems. Numeral 5' designates a rotating ring which is rotatably mounted to the field stop 2 and a portion of which is formed as a first bevel gear 5'a facing toward the window lens means 3. Numerical 6' designates an operating ring which is rotatably arranged adjacent to the window lens means 3 and a portion of which is formed as a second bevel gear 6'a which meshes with the first bevel gear 5'a through a cut hole 4a (refer to FIG. 5) provided to a base 4.

The field stop operating mechanism according to the present invention, which is arranged as described in the above, operates as follows. When the operating ring 6' is rotated, the rotating ring 5' is rotated through the second bevel gear 6'a and the first bevel gear 5'a in turn as it may be evident from FIG. 4. The field stop 2 is stopped down or opened by rotation of the rotating ring 5'.

The field stop operating mechanism according to the present invention enables to operate the field stop very easily because the operating ring 6' is located adjacent to the window lens means. Moreover, as the cut hole 4a of the base 4 is completely covered up with the window lens means 3 and operating ring 6' and no gap or the like is caused at the top surface of the base 4, there is almost no possibility of permitting entrance of dust or the like to the inside of the illumination system.

I claim:

1. A field stop operating mechanism for microscopes comprising a field stop arranged in the inside of a base of a microscope, a window lens means attached to said base to restrict the light passed through said field stop, a reflecting mirror located between said field stop and window lens means in the inside of said base to deflect the optical axis, a rotating ring arranged adjacent to said field stop to open and stop down said field stop, and an operating ring rotatably mounted around said window lens means and operatively connected with said rotating ring to rotate said rotating ring.

2. A field stop operating mechanism for microscopes according to claim 1 wherein said rotating ring is provided with a first bevel gear and said operating ring is provided with a second bevel gear meshed with said first bevel gear.

* * * * *